US012801921B2

(12) United States Patent
Kim et al.

(10) Patent No.: US 12,801,921 B2
(45) Date of Patent: Nov. 17, 2026

(54) DEVICE FOR PARTITIONING A NEURAL NETWORK AND OPERATION METHOD THEREOF

(71) Applicants: SK hynix Inc., Icheon (KR); Daegu Gyeongbuk Institute of Science and Technology, Daegu (KR)

(72) Inventors: Yeseong Kim, Daegu (KR); Jongho Park, Daegu (KR); Hyukjun Kwon, Daegu (KR); Seowoo Kim, Daegu (KR); Minho Ha, Icheon (KR); Eui Cheol Lim, Icheon (KR)

(73) Assignees: SK hynix Inc., Icheon (KR); Daegu Gyeongbuk Institute of Science and Technology, Daegu (KR)

( * ) Notice: Subject to any disclaimer, the term of this patent is extended or adjusted under 35 U.S.C. 154(b) by 1064 days.

(21) Appl. No.: 18/048,356

(22) Filed: Oct. 20, 2022

(65) Prior Publication Data

US 2023/0376767 A1 Nov. 23, 2023

(30) Foreign Application Priority Data

May 17, 2022 (KR) ........................ 10-2022-0060378

(51) Int. Cl.
*G06N 3/082* (2023.01)
*G06N 3/0464* (2023.01)

(52) U.S. Cl.
CPC ........... *G06N 3/082* (2013.01); *G06N 3/0464* (2023.01)

(58) Field of Classification Search
CPC ............................. G06N 3/082; G06N 3/0464
See application file for complete search history.

(56) References Cited

U.S. PATENT DOCUMENTS

| | | | |
|---|---|---|---|
| 10,452,971 B2 | 10/2019 | Chung et al. | |
| 11,138,504 B2 | 10/2021 | Francesco et al. | |
| 2021/0232921 A1 | 7/2021 | Parashar et al. | |
| 2022/0375033 A1 * | 11/2022 | Suzuki ..................... | G06N 3/09 |

OTHER PUBLICATIONS

Alonso, Tobias, et al. "Elastic-df: Scaling performance of dnn inference in fpga clouds through automatic partitioning." ACM Transactions on Reconfigurable Technology and Systems (TRETS) 15.2 (2021): 1-34. (Year: 2021).*
Saguil, Darren, and Akramul Azim. "A layer-partitioning approach for faster execution of neural network-based embedded applications in edge networks." IEEE Access 8 (2020): 59456-59469. (Year: 2021).*

(Continued)

*Primary Examiner* — Li B. Zhen
*Assistant Examiner* — Griffin Tanner Bean

(57) ABSTRACT

A device for partitioning an input neural network includes an interposing circuit configured to determine a partitioning position to at which the input neural network is to be partitioned, to interpose a partitioning layer in the input neural network at the partitioning position; and to output and entire neural network that is obtained by interposing the partitioning layer in the input neural network, a training circuit configured to train the entire neural network; and a partitioning circuit configured to divide the entire neural network into a plurality of neural network partitions by partition the partitioning layer. The input neural network includes a plurality of layers.

13 Claims, 9 Drawing Sheets

(56) References Cited

OTHER PUBLICATIONS

Song, Linghao, et al. "Accpar: Tensor partitioning for heterogeneous deep learning accelerators." 2020 IEEE International Symposium on High Performance Computer Architecture (HPCA). IEEE, 2020. (Year: 2020).*
Szymon Migacz, "Nvidia 8-bit inference with tensorRT", GPU Technology Conference, vol. 10, May 8, 2017.
Yunji Chen, et al., "Diannao family: energy-efficient hardware accelerators for machine learning", Communications of the ACM, 59(11):105-112, Nov. 2016.
Norman P Jouppi, et al., "In-datacenter performance analysis of a tensor processing unit", Proceedings of the 44th annual international symposium on computer architecture, pp. 1-12, Jun. 2017.
Ahmad Shawahna, et al., "Fpga-based accelerators of deep learning networks for learning and classification: A review", IEEE Access, 7:7823-7859, vol. 4, 2018.
Denis Foley et al., "Ultra-performance pascal gpu and nvlink interconnect", IEEE Micro, 37(2):7-17, Mar./Apr. 2017.
Anastasia Koloskova, et al., "Decentralized deep learning with arbitrary communication compression", arXiv preprint arXiv:1907.09356, pp. 1-22, Nov. 11, 2020.
Ganggang Dong, et al., "A review of the autoencoder and its variants: A comparative perspective from target recognition in synthetic-aperture radar images", IEEE Geoscience and Remote Sensing Magazine, 6(3):44-68, Sep. 2018.
Alex Krizhevsky, "One weird trick for parallelizing convolutional neural networks", CoRR, abs/1404.5997, Apr. 29, 2014, pp. 1-7.
Linghao Song, et al., "Hypar: Towards hybrid parallelism for deep learning accelerator array", 2019 IEEE International Symposium on High Performance Computer Architecture (HPCA), pp. 56-68, 2019.
Minjie Wang, et al., "Supporting very large models using automatic dataflow graph partitioning", Proceedings of the Fourteenth EuroSys Conference 2019, EuroSys '19, New York, NY, USA, Feb. 20, 2019, pp. 1-18, Association for Computing Machinery.
Linghao Song, et al., "Accpar: Tensor partitioning for heterogeneous deep learning accelerators", 2020 IEEE International Symposium on High Performance Computer Architecture (HPCA), pp. 342-355, 2020.
Yakun Sophia Shao, et al., "Simba: Scaling deep-learning inference with multi-chip-module-based architecture", Proceedings of the 52nd Annual IEEE/ACM International Symposium on Microarchitecture, MICRO '52, pp. 14-27, Oct. 12-16, 2019, Association for Computing Machinery, Columbus, OH, USA.
Pierre Baldi, "Autoencoders, unsupervised learning, and deep architectures", Proceedings of ICML workshop on unsupervised and transfer learning, pp. 37-49, JMLR Workshop and Conference Proceedings, 2012.
Chuanqi Tan, et al., "A survey on deep transfer learning", International conference on artificial neural networks, pp. 270-279. Springer, Aug. 6, 2018.
Luis Perez et al., "The effectiveness of data augmentation in image classification using deep learning", arXiv preprint arXiv:1712.04621, Dec. 13, 2017.
"Welcome to UC Irvine machine learning repository!", https://archive.ics.uci.edu/, Apr. 14, 2021.
Anthony Thomas, et al., "Hierarchical and distributed machine learning inference beyond the edge", 2019 IEEE 16th International Conference on Networking, Sensing and Control (ICNSC), pp. 18-23. IEEE, 2019.
Kaiming He, et al., "Deep residual learning for image recognition", Proceedings of the IEEE conference on computer vision and pattern recognition, Dec. 10, 2015, pp. 1-12.
Olaf Ronneberger, et al., "U-net: Convolutional networks for biomedical image segmentation", International Conference on Medical image computing and computer-assisted intervention, pp. 234-241. Springer, May 18, 2015.
Hang Qi, et al., "Paleo: A performance model for deep neural networks", 2017, pp. 1-10.
Alex Krizhevsky, "Learning multiple layers of features from tiny images", Apr. 8, 2009.
Amir Erfan Eshratifar et al., "BottleNet: A Deep Learning Architecture for Intelligent Mobile Cloud Computing Services," 2019 IEEE/ACM International Symposium on Low Power Electronics and Design (ISLPED), Jul. 29, 2019.
Jiawei Shao et al., "BottleNet++: An End-to-End Approach for Feature Compression in Device-Edge Co-Inference Systems," 2020 IEEE International Conference on Communications Workshops (ICC Workshops), Jun. 7, 2020.

* cited by examiner

DEVICE FOR PARTITIONING A NEURAL NETWORK AND OPERATION METHOD THEREOF

CROSS-REFERENCE TO RELATED APPLICATION

The present application claims priority under 35 U.S.C. § 119(a) to Korean Patent Application No. 10-2022-0060378, filed on May 17, 2022, which is incorporated herein by reference in its entirety.

BACKGROUND

1. Technical Field

Various embodiments generally relate to a device for partitioning a neural network and an operation method thereof.

2. Related Art

As deep learning technologies for neural networks develop, various accelerator technologies using ASICs, GPUs, or FPGAs are being developed.

As a size of a neural network increases to improve service quality, a processing power of an accelerator for deep learning increases, and accordingly, a size of a semiconductor chip used in the accelerator also increases.

However, there is a limit in increasing the size of the semiconductor chip due to limitations in a circuit area and power consumption.

Accordingly, in order to process one complicated neural network, a technique of partitioning the complicated neural network into a plurality neural network partitions and a technique of processing the neural network partitions in different accelerators are used.

In this case, intermediate data generated during neural network processing is transferred between the accelerators. Because a size of the intermediate data is large, it takes a long time to transfer the intermediate data between the accelerators and thus a communication speed between the accelerators is slower, which may degrade the overall performance.

In order to solve this drawback, a technology of transmitting data via a host system equipped with multiple accelerators or a technology of compressing data by a transmitting accelerator and decompressing compressed data by a receiving accelerator is used.

However, the former technology requires a specialized interface such as NVLink, and the latter technology requires additional software and hardware in the accelerators for data compression and decompression.

SUMMARY

In accordance with an embodiment of the present disclosure, a device for partitioning an input neural network may include an interposing circuit configured to determine a partitioning position at which the input neural network is to be partitioned, to interpose a partitioning layer in the input neural network at the partitioning position, and to output an entire neural network that is obtained by interposing the partitioning layer in the input neural network, the input neural network including a plurality of layers; a training circuit configured to train the entire neural network; and a partitioning circuit configured to divide the entire neural network into a plurality of neural network partitions by partitioning the partitioning layer.

In accordance with an embodiment of the present disclosure, a method for partitioning an input neural network may include determining a partitioning position at which the input neural network is to be partitioned, the input neural network including a plurality of layers; interposing a partitioning layer in the input neural network at the partitioning position; outputting an entire neural network that is obtained by interposing the partitioning layer in the input neural network; training the entire neural network; and dividing the entire neural network into a plurality of neural network partitions by partitioning the partitioning layer.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate various embodiments, and explain various principles and advantages of those embodiments.

DETAILED DESCRIPTION

The following detailed description references the accompanying figures in describing illustrative embodiments consistent with this disclosure. The embodiments are provided for illustrative purposes and are not exhaustive. Additional embodiments not explicitly illustrated or described are possible. Further, modifications can be made to presented embodiments within the scope of teachings of the present disclosure. The detailed description is not meant to limit this disclosure. Rather, the scope of the present disclosure is defined in accordance with claims and equivalents thereof. Also, throughout the specification, reference to "an embodiment" or the like is not necessarily to only one embodiment, and different references to any such phrase are not necessarily to the same embodiment(s).

Figure 1:
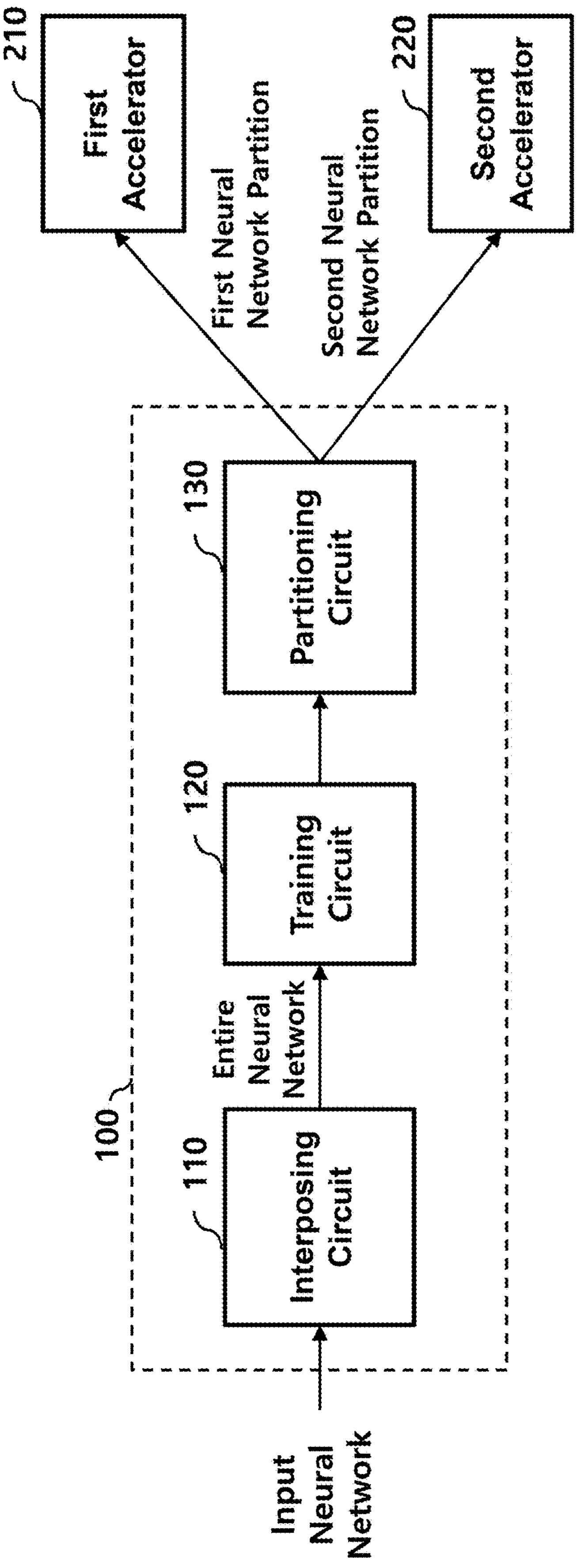
FIG. 1 illustrates a device for partitioning a neural network according to an embodiment of the present disclosure.

FIG. 1 illustrates a device 100 for partitioning an input neural network according to an embodiment of the present disclosure.

The device 100 includes an interposing circuit 110, a training circuit 120, and a partitioning circuit 130.

The interposing circuit 110 interposes a partitioning layer at a position where the input neural network is to be partitioned and outputs an entire neural network that is generated by interposing the partitioning layer in the input neural network.

Figure 2A:
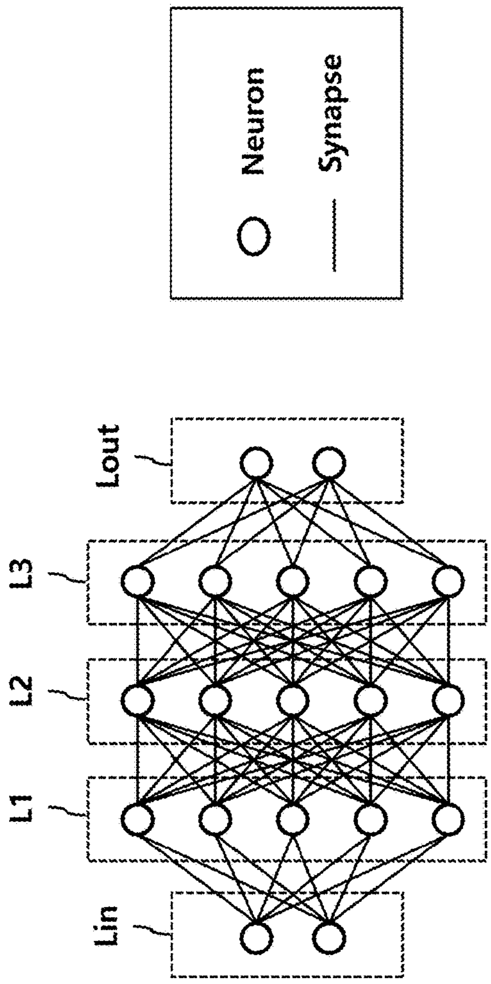
FIGS. 2A, 2B, 3A, and 3B illustrate a procedure of partitioning a neural network according to an embodiment of the present disclosure.
Figure 2B:
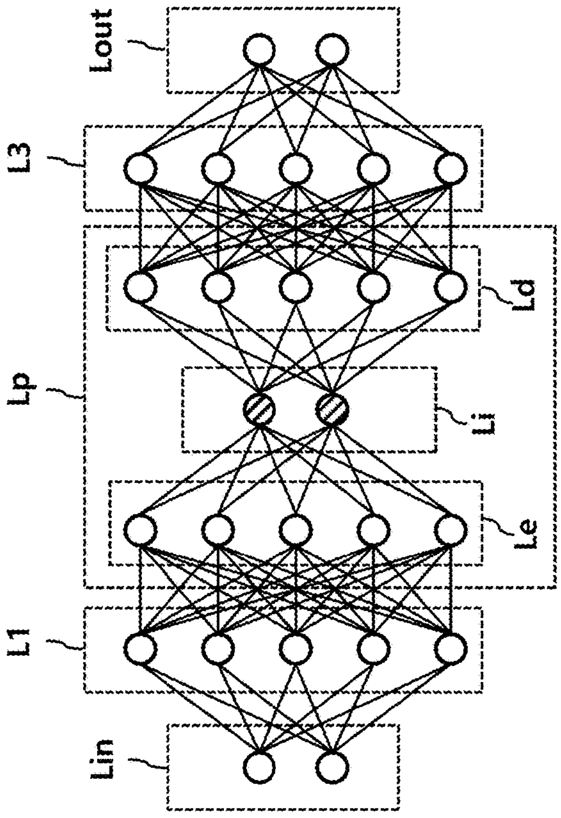

FIGS. 2A and 2B illustrate a procedure of interposing a partitioning layer using a fully connected neural network as an example.

In FIGS. 2A and 2B, circles correspond to neurons of the neural network, and solid lines correspond to synapses connecting neurons. Since a neural network including neurons and synapses is well known, a detailed description thereof will be omitted.

The neural network includes a plurality of layers. Hereinafter, a set of data corresponding to neurons of each layer may be referred to as a 'tensor.'

That is, a tensor output from one layer is used as an input for the next layer.

FIG. 2A shows the input neural network of FIG. 1 according to an embodiment of the present disclosure.

Referring to FIG. 2A, the input neural network includes an input layer Lin, an output layer Lout, and first to third layers L1 to L3 sequentially positioned between the input layer Lin and the output layer Lout.

FIG. 2B shows a neural network in which a partitioning layer Lp is interposed at a partitioning position.

In the present embodiment, it is assumed that the second layer L2 of FIG. 2A is determined as the partitioning position, and accordingly, the partitioning layer Lp is connected between the first layer L1 and the third layer L3 of FIG. 2A.

In this embodiment, the partitioning layer Lp has an autoencoder structure and includes an encoding layer Le and a decoding layer Ld. The partitioning layer Lp further includes an intermediate layer Li between the encoding layer Le and the decoding layer Ld.

The encoding layer Le and the intermediate layer Li correspond to an encoder, and the intermediate layer Li and the decoding layer Ld correspond to a decoder. An autoencoder includes the encoder and the decoder.

The number of neurons included in the intermediate layer Li is smaller than the number of neurons included in the encoding layer Le. That is, an input tensor of the encoder is encoded to output an encoded tensor having a smaller size than the input tensor.

The number of neurons included in the decoding layer Ld is the same as the number of neurons included in the encoding layer Le. Therefore, in the decoder, the encoded tensor, is decoded to output a decoded tensor having the same size as the input tensor, i.e., to recover an original tensor that is the input tensor.

When the input neural network is simply divided by the conventional technique at the second layer L2 without interposing the partitioning layer Lp, a tensor having a size corresponding to the second layer L2 must be transferred between accelerators.

In contrast, when the input neural network is divided with the partitioning layer Lp interposed at the second layer L2 as in the present embodiment, the encoded tensor having a smaller size than the tensor corresponding to the second layer L2 may be transmitted between accelerators.

Since both the encoder and the decoder of the autoencoder are neural networks that can be processed by a conventional accelerator, there is no need to change a hardware structure of the accelerator to apply the present technology.

A structure of the autoencoder itself is well known in the art, and may have a fully connected form, a convolutional form, or any of other forms.

The autoencoder illustrated in FIG. 2B includes two fully-connected layers, but such an autoencoder, i.e., a fully connected autoencoder, has a problem in that spatial information cannot be maintained.

Accordingly, assuming that a partitioning layer is interposed where spatial information is important, it is not desirable to use the fully connected autoencoder illustrated in FIG. 2B.

In this case, a two-dimensional convolutional autoencoder can be used as the partitioning layer. Through this, the number of channels can be reduced while maintaining the same feature map size.

In the present embodiment, it is assumed that one layer is included in each of the encoder and the decoder of the autoencoder, but the number of layers included in each of the encoder and the decoder may be increased according to another embodiment.

Figure 4:
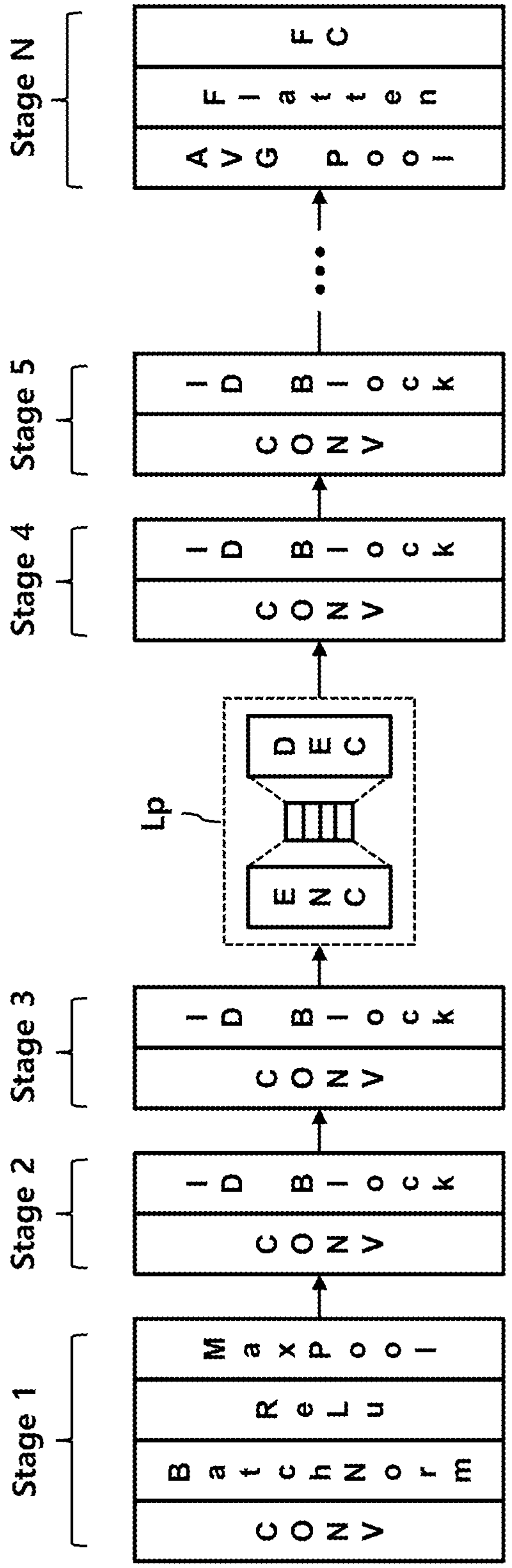
FIGS. 4 and 5 each illustrate the arrangement of a partitioning layer in a neural network according to an embodiment of the present disclosure.
Figure 5:
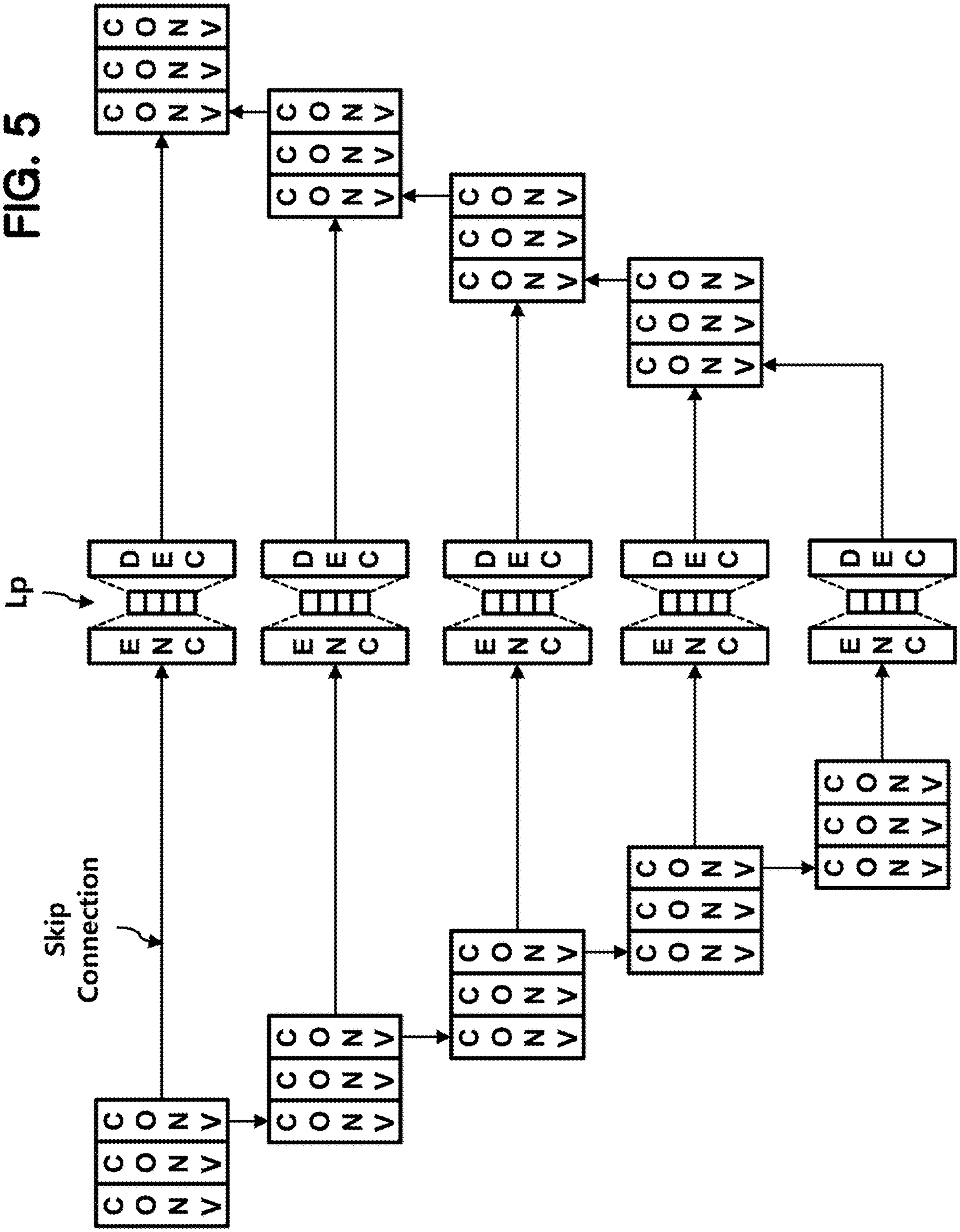

FIGS. 4 and 5 each illustrate the arrangement of a partitioning layer included in an input neural network.

FIG. 4 shows an example of interposing a partitioning layer Lp in a convolutional neural network ResNet, which is well known.

The convolutional neural network ResNet includes multiple stages having different channel depths, and the partitioning layer Lp can be placed between any two of the multiple stages. The partitioning layer Lp is placed at the end of a stage.

Referring to FIG. 4, the partitioning layer Lp is interposed between a stage 3 and a stage 4.

FIG. 5 is an example of interposing a partitioning layer Lp in a complete convolutional neural network UNet, which is frequently used for image segmentation.

The complete convolutional neural network UNet includes a plurality of skip connections as shown in FIG. 5.

FIG. 5 shows a procedure of completely partitioning the complete convolutional neural network UNet into two neural networks by interposing the partitioning layer Lp in each of the plurality of skip connections.

The partitioning layer Lp may be interposed at any position in the input neural network, but an appropriate position may be selected to optimize performance.

Returning to FIG. 1, the training circuit 120 performs a training operation on the entire neural network that is generated by interposing the partitioning layer in the input neural network. At this time, a training method for the training operation varies depending on whether the input neural network has already been trained or not.

If the input neural network has not been trained, i.e., the input neural network is not a pre-trained neural network, the training operation is performed on the entire neural network in which the partitioning layer is interposed.

In an embodiment, the training operation is performed on the entire neural network using a supervised training method with training data.

Since the training operation itself for the neural network including the autoencoder is well known in the prior art, a detailed description thereof will be omitted.

On the other hand, if the input neural network has already been trained by a previous training operation, i.e., the input neural network is a pre-trained neural network, an additional training operation should be performed on the partitioning layer.

For example, a neural network, such as ResNet-156, which has already been trained using training data such as ImageNet, can be provided as the input neural network.

Autoencoders tend to generate random values at the beginning of training, and accordingly catastrophic forgetting may occur in the input neural network when the training operation is performed on the entire neural network generated by interposing the partitioning layer in the input neural network that has been trained. As a result, training results of the input neural network, which were obtained by the previous training operation, can be invalid, so that training efficiency may be decreased.

Accordingly, when the input neural network has been trained by the previous training operation, it is necessary to train the partitioning layer while reflecting the training results of the input neural network as much as possible.

To this end, a two-phase training operation is performed.

The first phase training of the two-phase training operation is performed only on the partitioning layer while maintaining weights included in the pre-trained input neural network. In an embodiment, the first phase training is performed by adjusting weights of the partitioning layer with weights of the previously trained input neural network.

In general, a training operation of an autoencoder aims to ensure the generality of a trained neural network, i.e., to avoid the overfitting problem and to operate correctly even for input data not included in training data.

Therefore, it is important to perform a training operation while avoiding the overfitting problem.

In this embodiment, the training data is reinforced by generating variations of the training data using data augmentation known through prior articles such as 『Luis Perez et al., "The Effectiveness of Data Augmentation in Image Classification using Deep Learning," arXiv preprint arXiv: 1712.04621, 2017.』.

For example, various transformed image data may be augmented by applying distortion, color change, saturation, contrast, and brightness change to image data.

Through this, the autoencoder can learn various patterns and operate correctly on various input data.

The training operation of the autoencoder using the training data and augmented data is well known.

For example, the first phase training may be performed until a value of a loss function converges below a predetermined value.

When the first phase training operation is completed, the second phase training of the two-phase training operation is performed.

In the second phase training operation, fine-tuning is performed by retraining (or adjusting) weights of the entire neural network including the pre-trained input neural network and the partitioning layer.

The autoencoder outputs data related to an operation of the pre-trained input neural network through the first phase training.

Accordingly, the catastrophic forgetting caused by the autoencoder does not occur in the second phase training operation.

Figure 6:
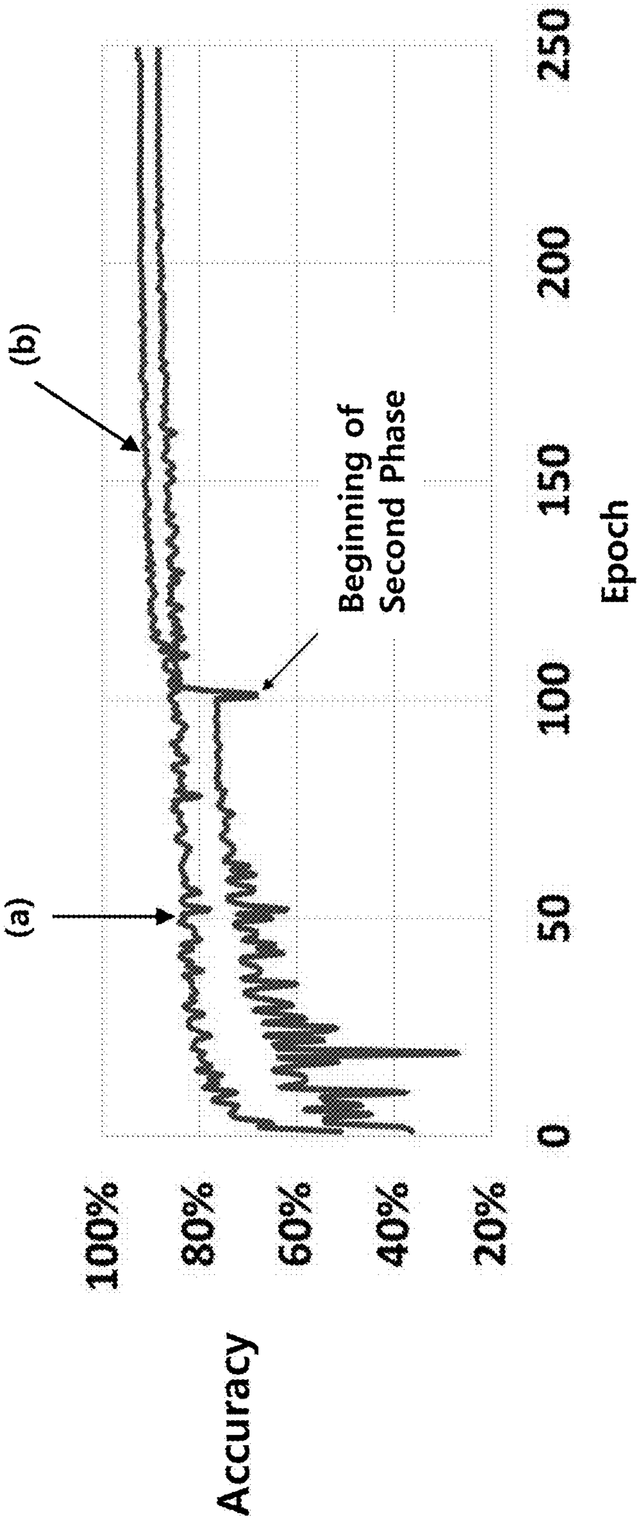
FIG. 6 is a graph showing an effect of training a neural network according to an embodiment of the present disclosure.

FIG. 6 is a graph showing change in accuracy by the second phase training operation.

FIG. 6 is an experimental result when the input neural network is a complete convolutional neural network UNet. In FIG. 6, (a) corresponds to a first case where the entire neural network, which includes the input neural network having not been trained, is trained, and (b) corresponds to a second case where the two-phase training operation is performed on the entire neural network that includes the pre-trained input neural network.

In the second case, during the first phase training of the autoencoder, the accuracy is lower than that of the first case, but after the first phase training, the performance in the second phase training is improved by about 4.1% compared to the first case.

Returning to FIG. 1, the partitioning circuit 130 divides the entire neural network, which has been trained, based on the partitioning layer.

Figure 3B:
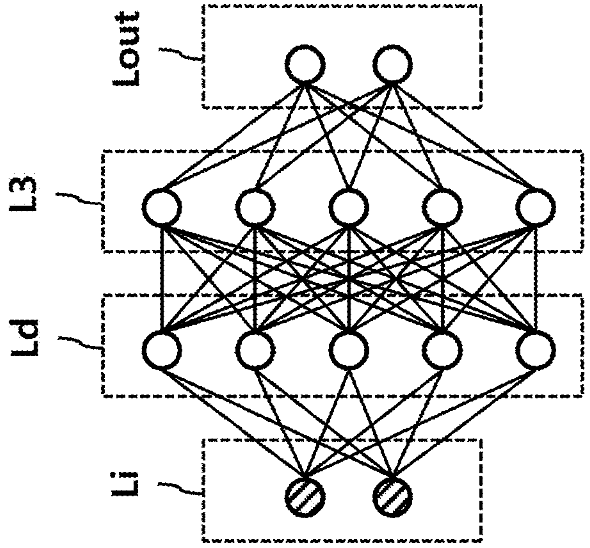
Figure 3A:
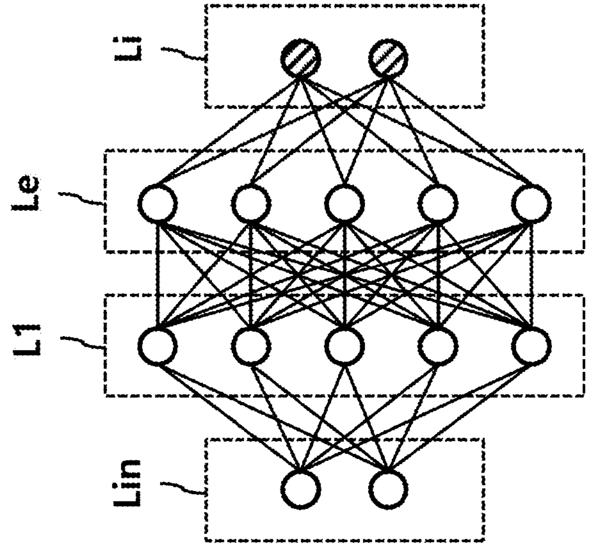

For example, the entire neural network illustrated in FIG. 2B is divided into two neural network partitions as shown in FIGS. 3A and 3B.

FIG. 3A shows a neural network disposed before the intermediate layer Li in FIG. 2B, and is referred to as a first neural network partition.

FIG. 3B shows a neural network disposed after the intermediate layer Li in FIG. 2B, and is referred to as a second neural network partition.

As shown in FIG. 1, the first neural network partition is allocated to a first accelerator 210, and the second neural network partition is allocated to a second accelerator 220.

The second neural network partition receives and processes the encoded tensor output from the first neural network partition.

That is, the encoded tensor is transmitted from the first accelerator 210 to the second accelerator 220.

As described above, since the size of the encoded tensor is smaller than that of the tensor before the encoding, an overhead due to communication between the first and the second accelerators 210 and 220 is reduced compared to the conventional technique where the input neural network is simply split without the encoding using the partitioning layer.

Hereinafter, the contribution of the partitioning layer on the accuracy of the input neural network is disclosed.

If the partitioning layer is interposed in the input neural network, the accuracy of the input neural network is lowered.

Figure 7A:
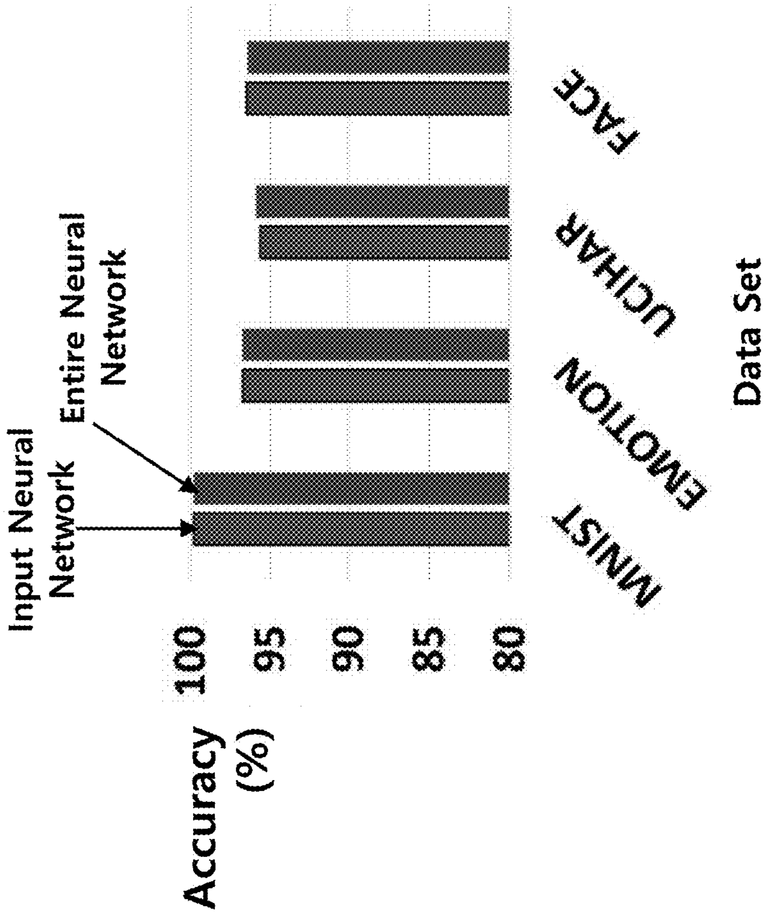
FIGS. 7A and 7B are graphs showing experimental results to compare accuracy and loss of an input neural network with those of an entire neural network according to an embodiment of the present disclosure.
Figure 7B:
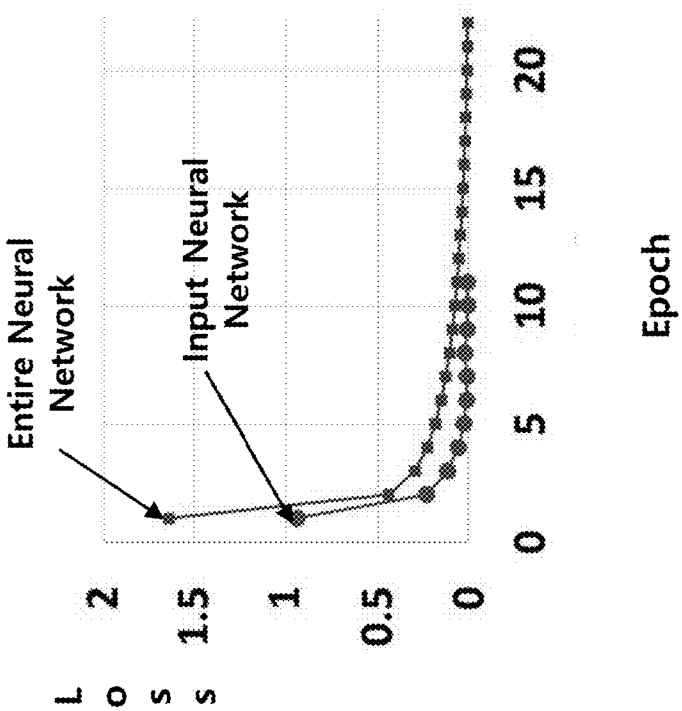

FIGS. 7A and 7B show experimental results to compare accuracy and loss of the input neural network with those of the entire neural network.

The input neural network used in an experiment is a fully connected neural network having two inner layers each containing 512 neurons.

The entire neural network is a neural network in which an autoencoder is placed between the two inner layers of the input neural network.

Both the input neural network and the entire neural network have been trained.

FIG. 7A is a graph to compare the accuracy of the input neural network with that of the entire neural network for four data sets MNIST, EMOTION, UCIHAR, and FACE, which are known in the related art.

The accuracy of the entire neural network is decreased by 0.05% on average compared to that of the input neural network, indicating that there is no significant difference in accuracy even though the autoencoder is interposed in the input neural network.

FIG. 7B shows normalized losses of the entire neural network and the input neural network according to epochs of the training.

In this experiment, the training was performed using the data set MNIST, and a categorical cross-entropy loss function was used.

As shown in the graph of FIG. 7B, the loss of the entire neural network including the autoencoder is larger than that of the input neural network when the same number of epochs of the training is performed.

However, it can be seen that the entire neural network can achieve substantially the same level of loss as the input neural network by increasing the number of epochs of the training.

Through the graphs of FIGS. 7A and 7B, it can be seen that even when the partitioning layer is interposed in the input neural network, there is no substantial difference in the results of the operation using the input neural network and the entire neural network.

Next, a technique for determining a position for interposing the partitioning layer will be described.

As described above, the partitioning layer may be disposed at any position in the input neural network. However, it is desirable to determine an optimal position to improve processing performance of an accelerator.

Assuming that two neural network partitions are generated by interposing the partitioning layer and they are allocated to two accelerators, a position where execution times of the two accelerators are substantially equal to each other is selected as the optimal position according to an embodiment.

In this case, the execution time includes a computation time in the accelerators and a communication time (or transmission time) required to transmit tensors.

The communication time may include a communication time between the accelerators and/or a communication time between a host system and the accelerators.

The communication time is proportional to a size of a tensor to be transmitted in a given bandwidth, and the computation time can be given as a first-order function of floating-point operations per second (FLOPS).

In this embodiment, the following method is used to determine the optimal position to place the partitioning layer.

First, there are provided a plurality of cases respectively corresponding to a plurality of candidate positions where the partitioning layer may be placed. The number of the plurality of cases, that is, the number of partitioning cases, is assumed to be N, which is a natural number greater than 1.

For each of the partitioning cases, it is assumed that each neural network partition is assigned to one accelerator, and the number of neural network partitions, that is, the number of accelerators, is assumed to be k.

In each of the partitioning cases, an execution time $exec_i$ of an i-th accelerator is given by Equation 1. Here, i is one of the natural numbers from 1 to k.

$$exec_i = comp_i + comm_i \quad \text{[Equation 1]}$$

In Equation 1, $comp_i$ represents a computation time of the i-th accelerator, and $comm_i$ represents a transmission time of a tensor at the i-th accelerator.

As shown in Equation 2, the maximum value among execution times of the k accelerators is expressed as $exec_j$.

$$exec_j = \max_{1 \le i \le k} exec_i \quad \text{[Equation 2]}$$

An evaluation value En corresponding to an n-th partitioning case is determined as in Equation 3, where n is one of the natural numbers from 1 to N.

At this time, in the present technology, the evaluation value En corresponding to the n-th partitioning case is determined by using the sum of differences between the execution time $exec_i$ and the maximum execution time $exec_j$.

$$E_n = \sum_{i=1, i \ne j}^{i=k} |exec_i - exec_j| \quad \text{[Equation 3]}$$

As the execution times of the k accelerators have similar values, each of the differences from the maximum value $exec_j$ becomes smaller, and the evaluation value En of Equation 3 has a smaller value.

In the present embodiment, the partitioning case in which the evaluation value En of Equation 3 has the smallest value, among the N partitioning cases is selected, and accordingly, the optimal position of the partitioning layer is determined to be a position corresponding to the selected partitioning case.

When the optimal position to interpose the partitioning layer is determined, additional optimization may be performed in consideration of a data reduction rate R.

The data reduction rate R is given by a ratio of a size Te of an encoded tensor to a size Tp of an original tensor before the partitioning as shown in Equation 4.

Taking FIGS. 2A and 2B as an example, the size of the tensor output from the second layer L2 of FIG. 2A corresponds to the size Tp, and the size of the tensor output from the intermediate layer Li of FIG. 2B corresponds to the size Te.

$$R = \frac{|T_p|}{|T_e|} \quad \text{[Equation 4]}$$

As the size Te of the encoded tensor decreases, a size of data transmitted between the accelerators decreases and the data reduction rate R increases accordingly.

Figure 8A:
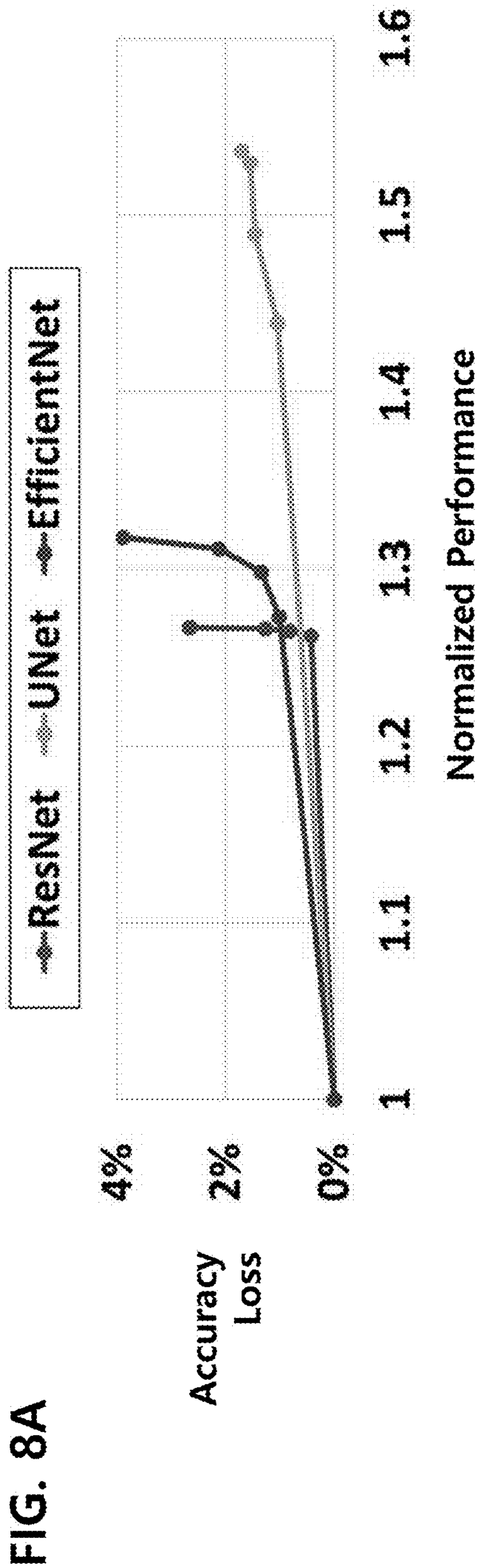
FIGS. 8A and 8B are graphs showing accuracy losses and error rates according to an embodiment of the present disclosure.
Figure 8B:
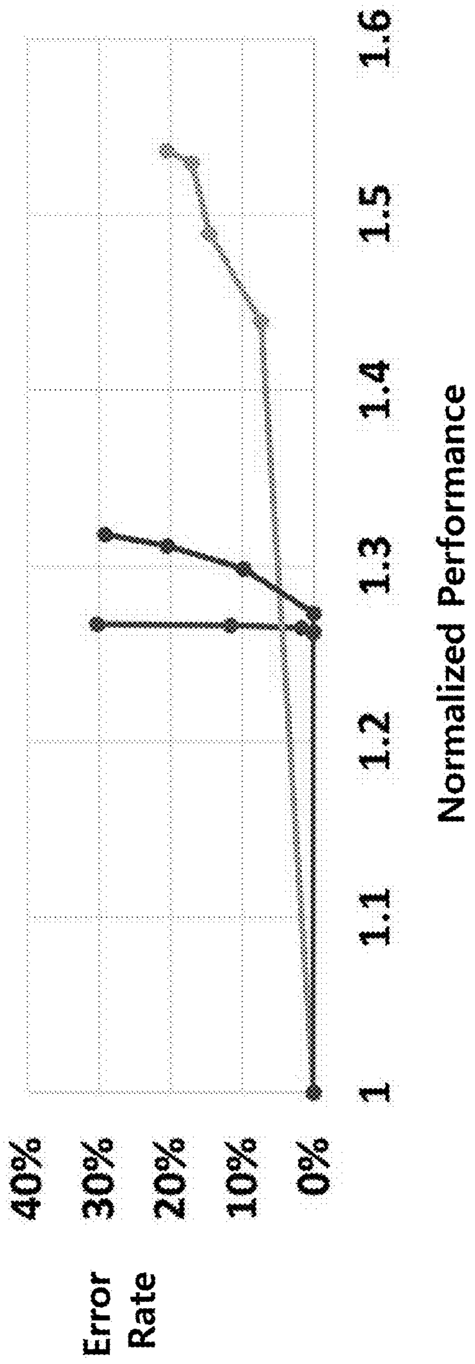

FIGS. 8A and 8B are graphs showing a relationship between performance and accuracy.

The performance is represented by a data reduction rate R. As the data reduction rate R increases, the performance improves, and as the data reduction rate R decreases, the performance deteriorates.

FIG. 8A shows experimental results obtained by performing a training operation on the entire neural network including the partitioning layer, and FIG. 8B shows experimental results obtained by performing a training operation on only the partitioning layer, rather than on the entire neural network.

Each experiment was performed on three neural networks: ResNet, UNet, and EfficientNet.

Referring to FIG. 8A, each of the neural networks ResNet and EfficientNet shows a form in which an accuracy loss increases as the performance improves, but the accuracy loss rapidly increases when the performance reaches a certain point. The neural network UNet also shows change in an increase rate of the accuracy loss when the performance reaches a certain point.

Therefore, an appropriate level of the data reduction rate R may be determined in consideration of the trade-off between the accuracy loss and the performance.

Taking the neural network ResNet as an example, when the data reduction rate R is 64, the accuracy loss is only 0.4%, but when the data reduction rate R increases lager than 64, the accuracy loss increases more rapidly. Therefore, the data reduction rate R for optimizing the performance can be determined as 64.

A specific data reduction rate may be easily determined by a person skilled in the art according to embodiments.

In order to derive a result as shown in FIG. 8A, a number of training processes need to be performed on the entire neural network, which significantly increases the cost.

In this embodiment, the relationship between the data reduction rate R and the accuracy loss was derived by training only the partitioning layer, that is, the autoencoder, instead of training the entire neural network.

For example, it is assumed that the neural network is divided into two neural network partitions because there is only one partitioning layer.

Among the two neural network partitions, a first neural network partition that provides a signal to the partitioning layer is represented by FL(x) and a second neural network partition that receives an output of the partitioning layer is represented by FR(x'), where x is an input tensor (e.g., an input image) that is input to the entire neural network and x' corresponds to a tensor generated by the partitioning layer.

Autoencoders generally aim to make a tensor output therefrom similar to a tensor input thereto. Accordingly, in the present embodiment, it can be seen that the encoder of the partitioning layer effectively performs an encoding operation when the data reduction rate R reaches a certain degree while satisfying FL(x)≒ x'.

The graph of FIG. 8B is achieved by observing an operation of the autoencoder according to the data reduction rate R with the autoencoder trained using FL(x).

The vertical axis of FIG. 8B represents an error rate between the tensor FL(x) input to the autoencoder and the tensor x' output from the autoencoder. In this case, cross entropy was used as a loss function to obtain the error rate.

It can be seen from the graph of FIG. 8B that as the data reduction rate R increases, the error rate increases, i.e., the performance of the autoencoder to restore the input tensor x decreases.

The graphs of FIGS. 8A and 8B have similar forms. Accordingly, similar data reduction rates may be determined from the case where only the autoencoder, i.e., only the partitioning layer, is trained and the case where the entire neural network is trained.

As a result of comparing the results of the two experiments based on the neural network ResNet, it is noted that there was a 76.9 times of speed increase when only the autoencoder is trained.

Figure 9:
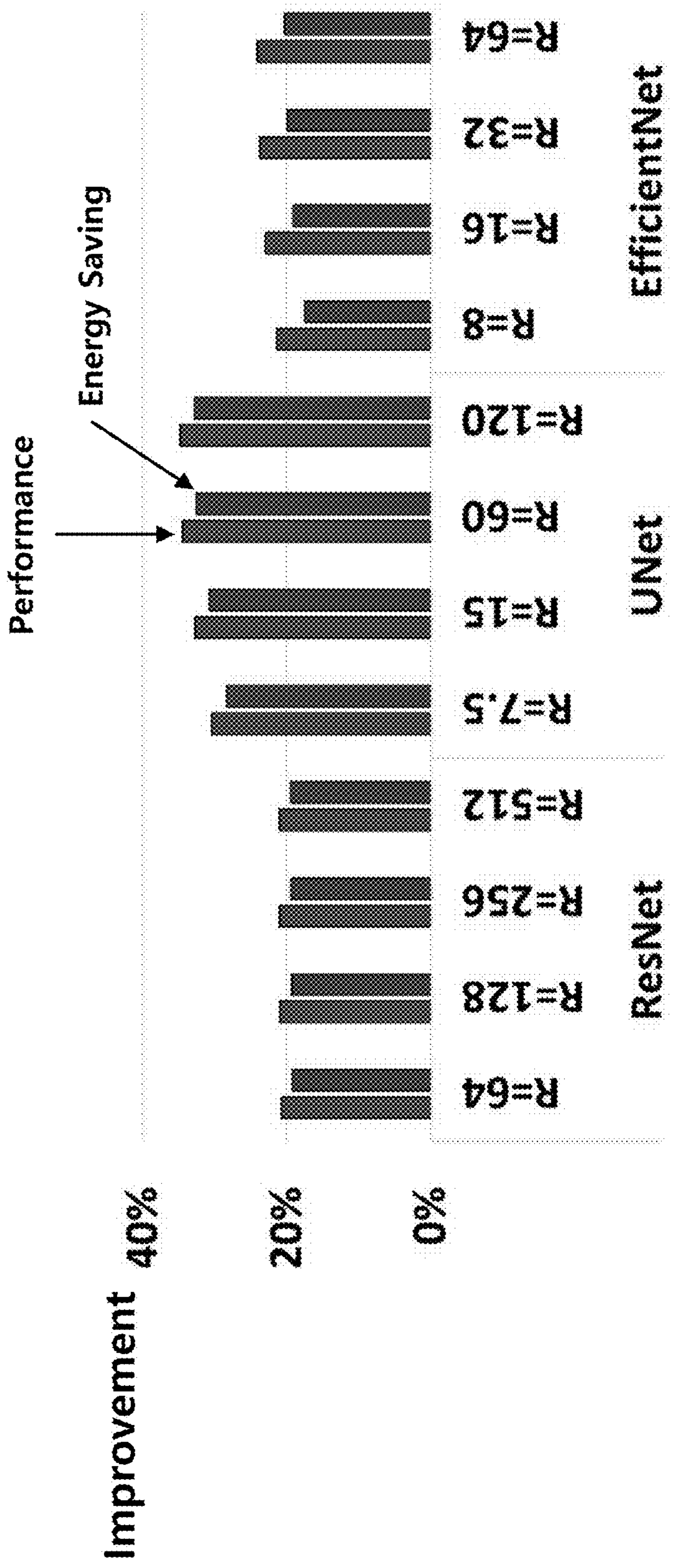
FIG. 9 is a graph showing performance improvement of neural networks according to an embodiment of the present disclosure.

FIG. 9 is a graph showing performance improvement of the present embodiment where the partitioning layer is interposed in the input neural network compared to the prior art where the input neural network is simply partitioned without the partitioning layer.

The graph of FIG. 9 shows a degree of performance improvement and a degree of energy saving according to kinds of neural networks and the data reduction rate R.

Taking the neural network ResNet as an example, it can be seen that there is a performance improvement and energy saving of about 20% for all data reduction rates.

The neural network EfficientNet shows performance and energy saving results similar to those of the neural network ResNet. In case of the neural network UNet, it can be seen that performance improvement and energy saving thereof are further increased compared to those of the neural networks ResNet and EfficientNet.

Although various embodiments have been illustrated and described, various changes and modifications may be made to the described embodiments without departing from the spirit and scope of the invention as defined by the following claims.

What is claimed is:

1. A device for partitioning an input neural network, the device comprising:

an interposing circuit configured to determine a partitioning position at which the input neural network is to be partitioned, to interpose a partitioning layer in the input neural network at the partitioning position, and to output an entire neural network that is obtained by interposing the partitioning layer in the input neural network, the input neural network including a plurality of layers;

a training circuit configured to train the entire neural network; and a partitioning circuit configured to divide the entire neural network into a plurality of neural network partitions by partitioning the partitioning layer, wherein the interposing circuit selects one of a plurality of partitioning cases to determine the partitioning position, the plurality of partitioning cases respectively corresponding to a plurality of candidate positions where the partitioning layer is to be placed, wherein the interposing circuit calculates, for each of the plurality of partitioning cases, an evaluation value using execution times of a plurality of accelerators respectively corresponding to the plurality of neural network partitions, wherein the interposing circuit selects the one of the plurality of partitioning cases based on evaluation values calculated for the plurality of partitioning cases, to optimize a processing load balance among the plurality of accelerators, a candidate position corresponding to the selected partitioning case being determined to be the partitioning position, and wherein the evaluation value is determined by summing differences between a maximum execution time among the execution times of the plurality of accelerators and each execution time as follows:

$$E_n = \sum_{i=1, i \neq j}^{i=k} |exec_i - exec_j|$$

where En indicates an evaluation value of an n-th partitioning case among the plurality of partitioning cases, k indicates a number of the accelerators, $exec_i$ indicates an execution time of an i-th accelerator, and $exec_j$ indicates the maximum execution time among the execution times of the plurality of accelerators.

2. The device of claim 1, wherein each of the execution times includes a computation time at a corresponding accelerator and a data transmission time at the corresponding accelerator.

3. The device of claim 1, wherein the partitioning layer includes an encoding layer to encode input data and output encoded data and a decoding layer to decode the encoded data, and wherein a size of the encoded data is smaller than a size of the input data.

4. The device of claim 3, wherein the partitioning circuit divides the entire neural network so that the encoding layer and the decoding layer are included in different neural network partitions.

5. The device of claim 3, wherein each of the encoding layer and the decoding layer is a fully connected neural network or a convolutional neural network.

6. The device of claim 1, wherein when the input neural network is a pre-trained neural network, the training circuit performs first phase training by adjusting weights of the partitioning layer with weights of the pre-trained input neural network.

7. The device of claim 6, wherein the training circuit further performs second phase training by adjusting weights of the entire neural network after the first phase training is completed.

8. A method for partitioning an input neural network, the method comprising:

determining a partitioning position at which the input neural network is to be partitioned, the input neural network including a plurality of layers;

interposing a partitioning layer in the input neural network at the partitioning position;

outputting an entire neural network that is obtained by interposing the partitioning layer in the input neural network;

training the entire neural network; and dividing the entire neural network into a plurality of neural network partitions by partitioning the partitioning layer, wherein determining the partitioning position includes:

calculating an evaluation value for each of a plurality of partitioning cases to partition the input neural network, the plurality of partitioning cases respectively corresponding to a plurality of candidate positions where the partitioning layer is to be placed; and selecting one of the plurality of partitioning cases based on evaluation values calculated for the plurality of partitioning cases, to optimize a processing load balance among the plurality of accelerators, a candidate position corresponding to the selected partitioning case being determined to be the partitioning position, and wherein the evaluation value is determined by summing differences between a maximum execution time among the execution times of the plurality of accelerators and each execution time as follows:

$$E_n = \sum_{i=1, i \neq j}^{i=k} |exec_i - exec_j|$$

where En indicates an evaluation value of an n-th partitioning case among the plurality of partitioning cases, k indicates a number of the accelerators, $exec_i$ indicates an execution time of an i-th accelerator, and $exec_j$ indicates the maximum execution time among the execution times of the plurality of accelerators.

9. The method of claim 8, wherein the evaluation value is determined by using execution times of a plurality of accelerators respectively corresponding to the plurality of neural network partitions, and wherein each execution time includes a computation time at a corresponding accelerator and a data transmission time of the corresponding accelerator.

10. The method of claim 8, wherein the partitioning layer includes an encoding layer to encode input data and output encoded data, and a decoding layer to decode the encoded data, and wherein a size of the encoded data is smaller than a size of the input data.

11. The method of claim 10, wherein dividing the entire neural network includes:

dividing the entire neural network so that the encoding layer and the decoding layer are included in different neural network partitions.

12. The method of claim 8, wherein, when the input neural network is a pre-trained neural network, training the entire neural network includes:

performing first phase training by adjusting weights of the partitioning layer with weights of the pre-trained input neural network.

13. The method of claim 12, wherein training the entire neural network further includes:

performing second phase training by adjusting weights of the entire neural network after the first phase training is completed.

* * * * *